(12) United States Patent
Figner et al.

(10) Patent No.: US 11,919,118 B2
(45) Date of Patent: Mar. 5, 2024

(54) METHOD FOR JOINING OR MACHINING AND APPARATUS THEREFOR

(71) Applicant: STIRTEC GmbH, Premstätten (AT)

(72) Inventors: Gunter Figner, Graz (AT); Christoph Zalar, Rosental (AT)

(73) Assignee: STIRTEC GMBH, Premstätten (AT)

( * ) Notice: Subject to any disclaimer, the term of this patent is extended or adjusted under 35 U.S.C. 154(b) by 175 days.

(21) Appl. No.: 17/433,437

(22) PCT Filed: Jan. 28, 2020

(86) PCT No.: PCT/AT2020/060026
§ 371 (c)(1),
(2) Date: Aug. 24, 2021

(87) PCT Pub. No.: WO2020/172696
PCT Pub. Date: Sep. 3, 2020

(65) Prior Publication Data
US 2022/0143768 A1  May 12, 2022

(30) Foreign Application Priority Data
Feb. 25, 2019 (AT) .................. A 50145/2019

(51) Int. Cl.
*B23K 20/00* (2006.01)
*B23K 20/12* (2006.01)
*B23Q 5/04* (2006.01)

(52) U.S. Cl.
CPC ........... *B23Q 5/045* (2013.01); *B23K 20/123* (2013.01); *B23K 20/125* (2013.01)

(58) Field of Classification Search
CPC .. B23K 20/123; B23K 20/125; B23K 20/122; B23K 20/1255; B23K 20/26; B23K 20/126; B23K 20/1245
See application file for complete search history.

(56) References Cited

U.S. PATENT DOCUMENTS 6,484,924 B1 * 11/2002 Forrest ................. B23K 20/126
228/2.1
6,874,672 B2 * 4/2005 Okamoto ............. B23K 20/122
228/2.1

(Continued)

FOREIGN PATENT DOCUMENTS

CN 106001899 10/2016
CN 107138848 9/2017

(Continued)

OTHER PUBLICATIONS

CN110039171A english computer translation (Year: 2023).*

(Continued)

*Primary Examiner* — Erin B Saad
(74) *Attorney, Agent, or Firm* — GREENBLUM & BERNSTEIN, P.L.C.

(57) ABSTRACT

A method for joining or machining, in particular a friction stir welding method, using an apparatus, in which a tool, in particular a friction stir welding tool, is driven via a spindle with a spindle axis. To achieve high process reliability, even when the method is applied in poorly accessible positions, an adapter, in particular an angle head, is arranged between the spindle and the tool so that the tool axis about which the tool rotates does not coincide with the spindle axis. A force acting on the spindle is measured and the method is controlled depending on the force measured at the spindle. The apparatus for joining or machining, in particular for friction stir welding, includes a headstock with a spindle, which can be rotated about a spindle axis and a tool, in particular a friction stir welding tool, which can be driven about a tool axis by the spindle.

20 Claims, 1 Drawing Sheet

(56) References Cited

U.S. PATENT DOCUMENTS

| | | | |
|---|---|---|---|
| 7,326,011 B2 | 2/2008 | Young et al. | |
| 10,335,895 B2* | 7/2019 | Odakura | B25J 9/1005 |
| 11,285,562 B2* | 3/2022 | Odakura | B23K 37/02 |
| 2002/0145031 A1* | 10/2002 | Hirano | B23K 20/123 |
| | | | 228/2.1 |
| 2003/0183673 A1* | 10/2003 | Hansen | B23K 20/125 |
| | | | 228/2.1 |
| 2004/0074944 A1* | 4/2004 | Okamoto | B23K 20/122 |
| | | | 228/2.1 |
| 2004/0129763 A1* | 7/2004 | Burford | B23K 20/123 |
| | | | 228/2.1 |
| 2007/0071566 A1 | 3/2007 | Young et al. | |
| 2007/0284419 A1* | 12/2007 | Matlack | B23K 20/26 |
| | | | 228/2.1 |
| 2008/0128472 A1* | 6/2008 | Park | B23K 20/1255 |
| | | | 228/2.1 |
| 2009/0039139 A1 | 2/2009 | Burton et al. | |
| 2010/0072261 A1* | 3/2010 | Cruz | B23K 20/123 |
| | | | 228/2.1 |
| 2010/0140324 A1* | 6/2010 | Fleming | B23K 20/125 |
| | | | 228/103 |
| 2010/0301795 A1* | 12/2010 | Sato | B23K 11/31 |
| | | | 318/646 |
| 2011/0079339 A1* | 4/2011 | Cruz | B23K 20/123 |
| | | | 228/2.1 |
| 2012/0118937 A1* | 5/2012 | Enzaka | B23K 20/123 |
| | | | 228/2.1 |
| 2014/0067286 A1* | 3/2014 | Castillo | B23K 20/122 |
| | | | 702/41 |
| 2017/0320161 A1* | 11/2017 | Weigl | B23K 20/123 |
| 2018/0297146 A1* | 10/2018 | Tomioka | B23K 20/125 |
| 2020/0306869 A1* | 10/2020 | Hardwick | B23K 20/227 |
| 2020/0376590 A1* | 12/2020 | Weigl | B23K 20/1255 |
| 2022/0101205 A1* | 3/2022 | Chandra | G06N 20/00 |
| 2022/0126394 A1* | 4/2022 | Ishiguro | B23K 20/125 |
| 2022/0143768 A1* | 5/2022 | Figner | B23Q 5/045 |

FOREIGN PATENT DOCUMENTS

| | | |
|---|---|---|
| CN | 107921574 | 4/2018 |
| CN | 108436246 | 8/2018 |
| JP | 2001-170782 | 6/2001 |

OTHER PUBLICATIONS

Zaeh F.M et al., "Friction Stir Welding Using NC Milling Machines", Welding and Cutting, DVS, Bd. 3, Nr. 4, ISSN: 1612-3433, Dec. 31, 2004, pp. 220-223.

Int'l Search Report (Form PCT/ISA/210) conducted in Int'l Application No. PCT/AT2020/060026 (May 4, 2020).

Int'l Written Opinion (Form PCT/ISA/237) conducted in Int'l Application No. PCT/AT2020/060026 (May 4, 2020).

Int'l Prelim. Exam. Report (Form PCT/IPEA/409) conducted in Int'l Application No. PCT/AT2020/060026 (Dec. 5, 2021).

China Search Report/Office Action conducted in China Appln. No. 202080028595.5 (dated Aug. 2, 2022) (w/ translation).

* cited by examiner

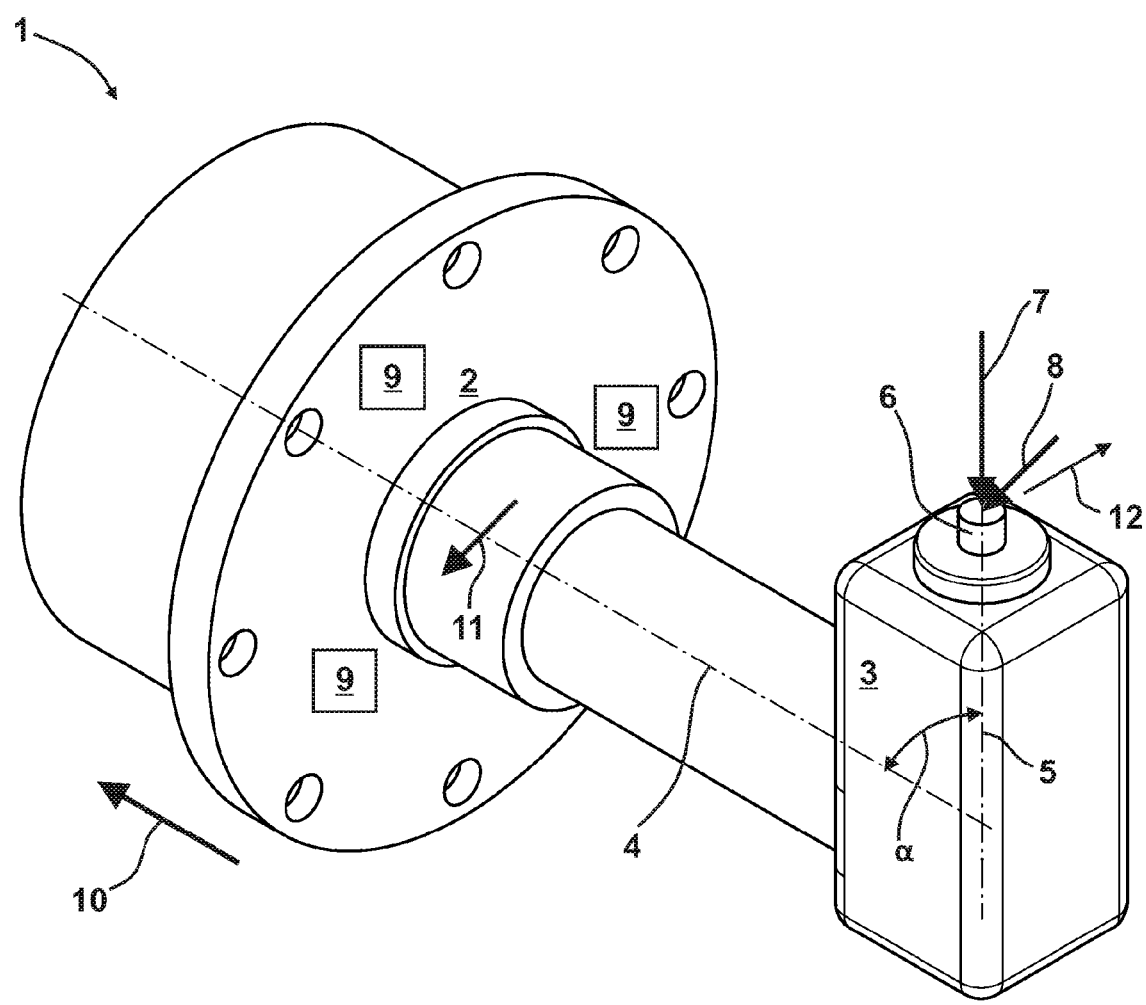

METHOD FOR JOINING OR MACHINING AND APPARATUS THEREFOR

The invention relates to a method for joining or machining, in particular a friction stir welding method, using an apparatus, wherein a tool, in particular a friction stir welding tool, is driven via a spindle with a spindle axis.

The invention furthermore relates to an apparatus for joining or machining, in particular for friction stir welding, comprising a headstock with a spindle which can be rotated about a spindle axis and a tool, in particular a friction stir welding tool, which can be driven about a tool axis by the spindle.

Various methods and apparatuses of this type have become known from the prior art. In methods and apparatuses of this type, it has proven disadvantageous that a joining or machining, in particular a friction stir welding, wherein particularly high forces occur, is, in poorly accessible positions, not possible or only possible with low process reliability.

This is addressed by the invention. The object of the invention is to specify a method of the type named at the outset with which corresponding joining or machining processes can be carried out with high efficiency and in a reliable manner even in inaccessible positions.

Furthermore, an apparatus is to be specified with which a joining or machining is possible with high process reliability even in poorly accessible positions.

The first object is obtained according to the invention by a method of the type named at the outset, in which method an adapter, in particular an angle head, is arranged between the spindle and the tool so that the tool axis about which the tool rotates does not coincide with the spindle axis, wherein a force acting on the spindle is measured and the method is controlled depending on the force measured at the spindle.

As a part of the invention, it was discovered that, with the use of an adapter such as an angle head for example, a friction stir welding is possible even in poorly accessible positions if a force acting on the spindle is measured and the method is controlled depending on the force measured at the spindle. As a result, damage to both the tool and also to the spindle can be prevented in a simple manner, which damage could be caused in particular by high forces occurring during friction stir welding in the direction of the tool axis in that permissible loads are exceeded.

Alternatively to friction stir welding, the method can of course also be used for other joining or machining processes, in particular for drilling, lathing or milling. Although an angle head is preferably used as an adapter, with which angle head an angle of approximately 90° can be achieved between the spindle axis and tool axis, the adapter can in principle be embodied in any desired manner, in order to constructively form a tool axis which differs from the spindle axis and to reach inaccessible positions with the tool.

Typically, the method is controlled such that an advancing direction, an advancing speed, a normal force applied via the tool in the direction of the tool axis, a rotation direction, and a rotation speed of the tool are preset to carry out a corresponding process step, for example to produce a weld seam in a friction stir welding method, whereupon the method is carried out accordingly, wherein a force acting on the spindle is measured and is, typically continuously, compared with a maximum value that, for example, corresponds to a permissible mechanical load of the apparatus, in particular the spindle or the adapter, or of the tool. If it is determined that the maximum value has been exceeded, the advancing speed, the normal force of the tool in the direction of the tool axis, and/or the rotation speed of the tool are changed until the measured force once again falls below the maximum value, possibly until it falls below an additional, lower threshold value. The advancing speed, the normal force of the tool in the direction of the tool axis, and/or the rotation speed can subsequently be changed again until these parameters once again reach the preset values or original values before the maximum value was exceeded.

It is beneficial if the control is regulated depending on the force measured at the spindle and on a machine constant assigned to the adapter. Thus, via the force measured at the spindle, forces and moments present at the tool can be deduced by means of the machine constant. Since basically any desired distances and angles between the tool and the spindle are possible with an angle head, the forces occurring at the spindle and the tool can vary accordingly. The machine constant normally corresponds to a geometry of the adapter in order to calculate, with the aid of forces measured at the spindle, forces acting on the tool arranged on the adapter at the force transmission point. Via a conversion by means of the machine constant, it is thus possible to indirectly deduce a load on the tool spaced apart from the spindle via the force or forces measured at the spindle. As a result, collisions of the tool, for example, can be indirectly identified via high forces at the spindle, even though no force-measuring device is typically arranged on the tool itself. The arrangement of a force-measuring device on the tool itself is thus not required in order to prevent damage to the tool during the method.

In methods from the prior art, damage to the spindle frequently occurs in a spindle bearing because, even though a force in the direction of the spindle axis, an axial spindle force, and a force on a plane perpendicular to the spindle axis, a shearing spindle force, are typically measured in the spindle, during a force transmission at a position spaced apart from the spindle a high bending moment also acts on the spindle, which bending moment subjects the spindle bearings to an additional load. By taking into account the geometry of the adapter or a distance of the force transmission point from the spindle, this bending moment can also be mathematically determined with the aid of the measured axial spindle force and the shearing spindle force, and the method can be controlled based on a corresponding maximum bending moment at the spindle in order to prevent damage to the spindle bearings.

It is preferably provided that forces in multiple spatial directions are measured at the spindle and a control occurs depending on distances of the tool from the spindle in multiple spatial directions. For example, a force at the spindle in the direction of the spindle axis or a shearing force on a plane perpendicular to the spindle axis can indicate an impermissibly large bending moment at or in the tool spaced apart from the spindle, so that the method must be limited in order to prevent damage to the tool. Thus, by measuring the axial spindle force and the shearing spindle force, a force at the tool in the direction of the tool axis, that is, an axial tool force, and a force at the tool in a direction perpendicular to the tool axis, that is, a radial tool force, as well as a load on the tool due to bending moments can normally be deduced. Through a corresponding inclusion of a distance of the force transmission point from the spindle, a moment at the spindle about an axis perpendicular to the spindle axis can also be determined by means of the measured forces in order to prevent impermissible loads on the spindle bearings.

Once distances between positions in which the forces at the spindle are measured and the tool are known from the angle head and the geometry of the apparatus, a conversion of the measured spindle forces, possibly also of measured spindle moments, into forces or moments acting on the tool is readily possible.

A particularly simple control results if the measured force is multiplied by a machine constant which depends on a distance of the tool from the spindle, before the measured force enters into the control. Of course, the machine constant can also have a vector format or a matrix format, particularly if forces and possibly moments are measured in multiple spatial directions and enter into the control. Furthermore, the machine constant can also be changed during the method in order to adapt the conversion from spindle forces to tool forces to distances between the tool and spindle that can vary due to an advancing movement, for example.

It can also be provided that the method is embodied to be carried out with different adapters, so that the machine constant is changed during a change in adapter. For example, the machine constant can be electronically imprinted in the angle head so that the control, which typically acts on a spindle drive, automatically acquires the machine constant during a replacement of the adapter or the angle head and is thus adjusted to the geometry or possible maximum load of the angle head with a change of the angle head.

It has proven effective that the adapter is detachably connected to the spindle and a force is measured by means of a force-measuring device arranged on the adapter. The force or forces in multiple spatial directions can thus be measured at the spindle both with a force-measuring device arranged on the spindle itself and also with a force-measuring device arranged at the angle head. Particularly if the force-measuring device is arranged directly on the angle head, said force-measuring device can already be configured such that output signals of the force-measuring device that enter into the control are already mathematically corrected for a distance of the tool from the spindle. The conversion of the measured force into values which are directly applicable for the control then occurs in the angle head itself.

With an adapter such as an angle head, basically any desired angles between the spindle axis and the tool axis can be achieved. It is preferably provided that the tool axis is arranged at an angle of 15° to 165°, in particular approximately 90°, to the spindle axis. Friction stir welded connections, for example, can then also be produced in positions that would not be reachable with an apparatus that is typically embodied to be very massive and large in order to apply accordingly large forces, and also on surfaces that have only a small distance to opposing components so that a correspondingly large apparatus cannot be positioned directly over the surface on which a weld seam is to be formed.

To be able to perform corresponding processes in particular on opposing components separated by a small distance, it is beneficial if at least two tools, in particular two friction stir welding tools, are arranged on the adapter and a control occurs depending on the force measured at the spindle and on which of the tools is used. The adapter is then embodied as an angle head with two tools arranged at opposite ends. Furthermore, the tools can also have a common tool axis which is aligned with the spindle axis at an angle. Thus, with the friction stir welding method, weld seams can be applied in a simple manner to closely spaced opposing surfaces, or components arranged accordingly can be welded together in a reliable process. If the control also takes into account which of the two tools is currently engaged, it is ensured that distances between the force transmission point and the spindle are correctly included and acting forces are accurately determined in order to control the method to achieve permissible loads.

The other object is achieved according to the invention by an apparatus of the type named at the outset in which an adapter, in particular an angle head, is arranged between the spindle axis and the tool axis so that the spindle axis does not coincide with the tool axis, wherein at least one force sensor is arranged in the region of the spindle to register a force acting on the spindle, wherein the apparatus is embodied for controlling a method, preferably a friction stir welding method, based on the measured force, in particular for carrying out a method according to the invention.

It is beneficial if a force-measuring system is provided to register forces in different spatial directions. Typically, shearing forces are registered on a plane perpendicular to the spindle axis and forces in the direction of the spindle axis are registered at the spindle and/or at the headstock. The force-measuring system can either be arranged between the spindle and headstock or on the angle head itself, and is normally calibrated to a force transmission point. Typically, a rotation direction of the tool is also included in the control, as said rotation direction is relevant in relation to a moment acting on the tool or the spindle.

It is preferably provided that the apparatus is embodied for controlling the method depending on a distance of the tool from the spindle, and that the control can be adjusted to varying distances, in particular due to different adapters.

Additional features, benefits and effects of the invention follow from the exemplary embodiment described below. The drawing which is thereby referenced shows the following:

FIG. 1 An apparatus for carrying out a method according to the invention.

FIG. 1 schematically shows an apparatus 1 according to the invention for carrying out a method according to the invention in a perspective illustration, wherein the apparatus 1 illustrated in the exemplary embodiment is embodied for carrying out a friction stir welding method.

Visible is a spindle 2 connected to a motor, not illustrated, via which spindle 2 a drive occurs, wherein the spindle 2 is connected to a tool 6 via an adapter embodied as an angle head 3, which tool 6 is connected to the angle head 3 such that the tool 6 can be rotated about a tool axis 5. The tool axis 5 is thereby aligned with the spindle axis 4 at an angle α of approximately 90° and the tool 6 is embodied as a friction stir welding tool. A pressing by the tool 6 in the direction of the tool axis 5 can thereby occur by a movement of the spindle 2 in the direction of the tool axis 5.

An advance of the tool 6 on a plane perpendicular to the tool axis 5 can also be implemented through a corresponding movement of the spindle 2.

In a friction stir welding method, high forces act on the tool 6, in particular an axial tool force 7 due to the pressing of the friction stir welding tool in the direction of the tool axis 5 against a workpiece, not illustrated, on which a weld seam is to be formed. Furthermore, during a movement along an advancing direction 12, a radial tool force 8 that is caused by the advance and, due to a rotation of the tool 6 about the tool axis 5, a moment, which additionally subjects the tool 6 to torsion stress, act on the tool 6. The forces are transmitted to the tool 6 at a force transmission point on the tool tip with which the weld seam is formed.

At the spindle 2, that is, at a position spaced apart from the tool 6, force-measuring devices, for example force-measuring sensors 9, are arranged which are illustrated by way of example in FIG. 1 and with which an axial spindle force 10 and a shearing spindle force 11 can be measured. The force-measuring devices can, for example, be positioned between the spindle 2 and headstock or at the angle head 3 or on the adapter itself in the region of the spindle 2. To prevent damage to the tool 6, the loads acting on the tool 6 are indirectly deduced via the force-measuring devices arranged at the spindle 2. For this purpose, the forces measured on the force-measuring devices at the spindle 2 are converted into forces acting on the tool 6, wherein a conversion thereby occurs depending on a distance of the tool 6 or the force transmission point from the spindle 2, in particular a spindle nose, for which the forces and moments at the spindle 2 are typically known, or on a distance of the force-measuring devices from the tool 6 both in the direction of the spindle axis 4 and also in the direction of the tool axis 5, possibly also in other spatial directions. Forces and moments occurring in all spatial directions are normally measured so that the forces acting on the tool 6 can be accurately deduced. As a result, collisions of the tool 6 in particular can be reliably detected, and the method can be regulated in a timely manner before the tool 6 or the apparatus 1 is damaged. Additionally, by including a distance of the force transmission point from the spindle nose in the control, for example via a machine constant by which the axial spindle force 10 and the shearing spindle force 11 are multiplied, it is then also possible to deduce bending moments acting on the spindle 2, if said bending moments cannot be registered directly, in order to determine a load on a spindle bearing. The method can thus be regulated if it is determined that permissible loads of the spindle bearings have been exceeded, before the spindle bearings are damaged.

In the method, measured forces are continuously compared with limit values which correspond to maximum permissible loads of the apparatus 1 and the tool 6. When a measured value that exceeds a limit value is registered by the force-measuring device, the control occurs in that a pressing force in the direction of the tool axis 5, an advancing speed on a plane perpendicular to the tool axis 5, and/or a rotation speed of the tool 6 about the tool axis 5 are reduced until loads at the spindle 2 and at the tool 6 within permissible limit values can be deduced based on the forces measured on the force-measuring devices.

With a method according to the invention and a corresponding apparatus 1, a friction stir welding method in particular can be carried out in an efficient manner even in poorly accessible positions, wherein damage to the friction stir welding tool and to the apparatus 1 can be reliably prevented.

On the one hand, a collision of the tool 6 with a component can be reliably detected. On the other hand, damage at the spindle 2 is prevented, in particular in the spindle bearings due to bending moments which are caused by long lever arms of the angle head 3.

In addition to friction stir welding, the method according to the invention and the corresponding apparatus 1 can also be used for milling, lathing and/or drilling, wherein corresponding advantages are likewise obtained.

The invention claimed is:

1. A method for friction stir welding using an apparatus that includes a tool embodied as a friction stir welding tool, a spindle with a spindle axis and an adapter arranged between the spindle and the tool so a rotational axis of the tool is oriented at 15° to 165° to the spindle axis, the method comprising:
    driving the tool, via the spindle;
    measuring a force acting on the spindle;
    controlling the friction stir welding depending on the force measured at the spindle and a machine constant of the adapter.

2. The method according to claim 1, wherein the control is regulated depending on the force measured at the spindle and on a machine constant assigned to the adapter.

3. The method according to claim 1, wherein forces in multiple spatial directions are measured at the spindle and a control occurs depending on distances of the tool from the spindle in multiple spatial directions.

4. The method according to claim 1, wherein the measured force is multiplied by the machine constant of the adapter, which depends on a distance of the tool from the spindle, before the measured force enters into the control.

5. The method according to claim 1, wherein the adapter, which comprises an angle head, is detachably connected to the spindle and the force acting on the spindle is measured by a force-measuring device arranged on the adapter.

6. The method according to claim 1, wherein the tool axis is arranged at an angle of approximately 90° to the spindle axis.

7. The method according to claim 1, wherein at least two friction stir welding tools, are arranged on the adapter and a control occurs depending on the force measured at the spindle and on which of the friction stir welding tools is used.

8. An apparatus for friction stir welding, comprising:
    a headstock with a spindle that is rotatable about a spindle axis;
    a tool, which is drivable about a tool axis by the spindle, wherein the tool is embodied as a friction stir welding tool;
    an adapter arranged between the spindle axis and the tool axis so that the spindle axis is oriented at an angle of 15° to 165° to the tool axis; and
    at least one force sensor arranged at the spindle to register a force acting on the spindle, and
    wherein the apparatus is embodied for controlling a friction stir welding method, based on the registered force and a machine constant of the adapter according to the method of claim 1.

9. The apparatus according to claim 8, further comprising a force-measuring system structured and arranged for registering forces in different spatial directions.

10. The apparatus according to claim 8, wherein the apparatus is embodied for controlling the friction stir welding method depending on a distance of the tool from the spindle, and the controlling is adjustable to varying distances.

11. The apparatus according to claim 8, wherein the adapter comprises an angle head so that the spindle axis does not align with the tool axis.

12. The apparatus according to claim 8, wherein the adapter comprises an angle head to orient the spindle axis at an angle of 15° to 165° to the tool axis.

13. The apparatus according to claim 8, wherein the varying distances are achieved via different adapters.

14. The apparatus according to claim 8, wherein the machine constant of the adapter is based on a geometry of the adapter.

15. An apparatus for friction stir welding, comprising:
    a headstock with a spindle, which is rotatable about a spindle axis;
    a tool, which is drivable about a tool axis by the spindle, wherein the tool is embodied as a friction stir welding tool;

an adapter arranged between the spindle axis and the tool axis so that the spindle axis is oriented at an angle of 15° to 165° to the tool axis; and at least one force sensor arranged at the spindle to register a force acting on the spindle, and wherein, based on the registered force and a machine constant of the adapter, the friction stir welding is controllable.

16. The apparatus according to claim 15, further comprising a force-measuring system structured and arranged for registering forces in different spatial directions.

17. The apparatus according to claim 15, wherein the apparatus is embodied for controlling the friction stir welding method depending on a distance of the tool from the spindle, and the controlling is adjustable to varying distances.

18. The apparatus according to claim 17, wherein the varying distances are achieved via different adapters.

19. The apparatus according to claim 15, wherein the adapter comprises an angle head to orient the spindle axis at an angle of 15° to 165° to the tool axis.

20. The apparatus according to claim 15, wherein the machine constant of the adapter is based on a geometry of the adapter.

\* \* \* \* \*